(12) United States Patent
Clarke (10) Patent No.: US 11,523,557 B1
(45) Date of Patent: Dec. 13, 2022

(54) MULTI-USE CONFIGURABLE RAKING SYSTEM

(71) Applicant: William S. Clarke, Fort Mill, SC (US)

(72) Inventor: William S. Clarke, Fort Mill, SC (US)

( * ) Notice: Subject to any disclaimer, the term of this patent is extended or adjusted under 35 U.S.C. 154(b) by 0 days.

(21) Appl. No.: 17/821,520

(22) Filed: Aug. 23, 2022

(51) Int. Cl.
| *A01D 7/00* | (2006.01) |
| *A01D 7/10* | (2006.01) |
| *A01D 11/06* | (2006.01) |

(52) U.S. Cl.
CPC .............. *A01D 7/00* (2013.01); *A01D 7/10* (2013.01); *A01D 11/06* (2013.01)

(58) Field of Classification Search
CPC ............. A01D 7/00; A01D 7/10; A01D 11/06
See application file for complete search history.

(56) References Cited

U.S. PATENT DOCUMENTS

| 5,713,193 | A | * | 2/1998 | Stapley | .................... | A01D 7/10 |
| | | | | | | 56/400.08 |
| 5,901,540 | A | * | 5/1999 | Vella | ........................ | A01D 7/10 |
| | | | | | | 56/400.21 |
| 7,131,255 | B1 | * | 11/2006 | Caneba | .................... | A01D 7/10 |
| | | | | | | 56/400.12 |

FOREIGN PATENT DOCUMENTS

DE          4136929 A1  *  5/1993   ............... A01D 7/10

* cited by examiner

*Primary Examiner* — Alicia Torres
(74) *Attorney, Agent, or Firm* — Shumaker, Loop & Kendrick, LLP; S. Alexander Long, Jr.

(57) ABSTRACT

A multi-use configurable raking system may have a first rake and a second rake. The first rake may have a first handle and a first rake head connected to the first handle. The second rake may have a second handle and a second rake head connected to the second handle. A connector may be affixed to the first rake and the second handle may be mounted on the first handle via the connector. The second rake may be variably positioned relative to the first rake. An orientation of the second rake relative to the first rake may be adjusted by rotation of the second rake relative to the first rake and a longitudinal position of the second rake relative to the first rake may be adjusted by movement of the second rake relative to the first rake along a longitudinal axis of the second handle.

13 Claims, 9 Drawing Sheets

MULTI-USE CONFIGURABLE RAKING SYSTEM

TECHNICAL FIELD

The present disclosure relates to manually operated or used tools. More particularly, the present disclosure relates to a multi-use tool for likely outdoor use such as gardening, raking, and landscaping.

BACKGROUND

A typical outdoor task of collecting debris such as leaves and sticks, and even littered debris, may require more than one type of collecting implement. Thus multiple types of rakes are available, differentiated most distinctly by their rake heads and respective tine arrangements. A typical work session may involve using multiple rakes, and losing time walking back and forth to reacquire a rake used just moments ago and set down.

An improved raking system serving multiple uses is needed.

SUMMARY

This summary is provided to briefly introduce concepts that are further described in the following detailed descriptions. This summary is not intended to identify key features or essential features of the claimed subject matter, nor is it to be construed as limiting the scope of the claimed subject matter.

According to at least one embodiment, a multi-use configurable raking system includes: a first rake having a first handle and a first rake head connected to the first handle; and a second rake having a second handle and a second rake head connected to the second handle. The second handle is mounted on the first handle such that the second rake can be variably positioned relative to the first rake.

An orientation of the second rake relative to the first rake may can be adjusted by rotation of the second rake relative to the first rake.

A longitudinal position of the second rake relative to the first rake may can be adjusted by movement of the second rake relative to the first rake along a longitudinal axis of the second handle.

The orientation of the second rake relative to the first rake may can be adjusted by rotation of the second rake relative to the first rake around the longitudinal axis.

A locking device may be provided by which at least one of the longitudinal position and orientation of the second rake relative to the first rake can be locked and unlocked.

The second handle may mounted on the first handle by way of the connector.

The connector may include a channel along the longitudinal axis, and at least a portion of the second handle may be received within the channel.

The connector may include a tubular barrel having an interior in which the channel is defined.

A locking device may be provided by which each of the longitudinal position and orientation of the second rake relative to the first rake can be locked and unlocked.

When the locking device is unlocked, the second handle can be rotated within the barrel around the longitudinal axis thereby adjusting the orientation of the second rake relative to the first rake; and the second handle can be moved longitudinally within the barrel thereby adjusting the longitudinal position of the second rake relative to the first rake.

The locking device may include a pin, and at least one of the barrel and second handle may include at least one hole. The other of the at least one of the barrel and second handle may include at least two holes. The pin may be positioned in the at least one hole and in at least one of the at least two holes when the locking device is locked.

The locking device may further include a clip that engages two ends of the pin to prevent inadvertent removal of the pin.

The multi-use configurable raking system of may further comprising a lever attached to the barrel.

The lever may be hingedly mounted on the barrel permitting the lever to pivot between perpendicular to the longitudinal axis and non-perpendicular the longitudinal axis.

The multi-use configurable raking system may further include a lever attached to the second handle and extending laterally relative to the longitudinal axis.

The multi-use configurable raking system may further include at least two bands that are longitudinally space and that affix the barrel to the first handle.

In some examples, the first rake head includes multiple first tines; the second rake head includes multiple second tines; and the orientation of the second rake relative to the first rake can be adjusted by rotation of the second rake relative to the first rake such that the first tines and second tines extend generally in a same direction. In such examples, the orientation of the second rake relative to the first rake can be adjusted by rotation of the second rake relative to the first rake such that the first tines and second tines extend generally in opposite directions.

The first rake may be one of a garden rake and a leaf rake, and the second rake may be the other of a garden rake and a leaf rake.

The garden rake may include multiple generally rigid parallel tines evenly spaced along a support rail.

The leaf rake may include a diverging array of tines which are semi-flexible and resilient, each having a distal hooked end.

The above summary is to be understood as cumulative and inclusive. The above described embodiments and features are combined in various combinations in whole or in part in one or more other embodiments.

BRIEF DESCRIPTION OF THE DRAWINGS

The previous summary and the following detailed descriptions are to be read in view of the drawings, which illustrate some, but not all, embodiments and features as briefly described below. The summary and detailed descriptions, however, are not limited to only those embodiments and features explicitly illustrated.

DETAILED DESCRIPTIONS

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although steps may be expressly described or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Like reference numbers used throughout the drawings depict like or similar elements. Unless described or implied as exclusive alternatives, features throughout the drawings and descriptions should be taken as cumulative, such that features expressly associated with some particular embodiments can be combined with other embodiments.

Unless defined otherwise, technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a," "an," and "the" refer to "one or more" when used in the subject specification, including the claims. Unless indicated to the contrary, the numerical parameters set forth in the instant specification and attached claims are approximations that can vary depending upon the desired properties sought to be obtained within the scope of these descriptions.

Figure 1:
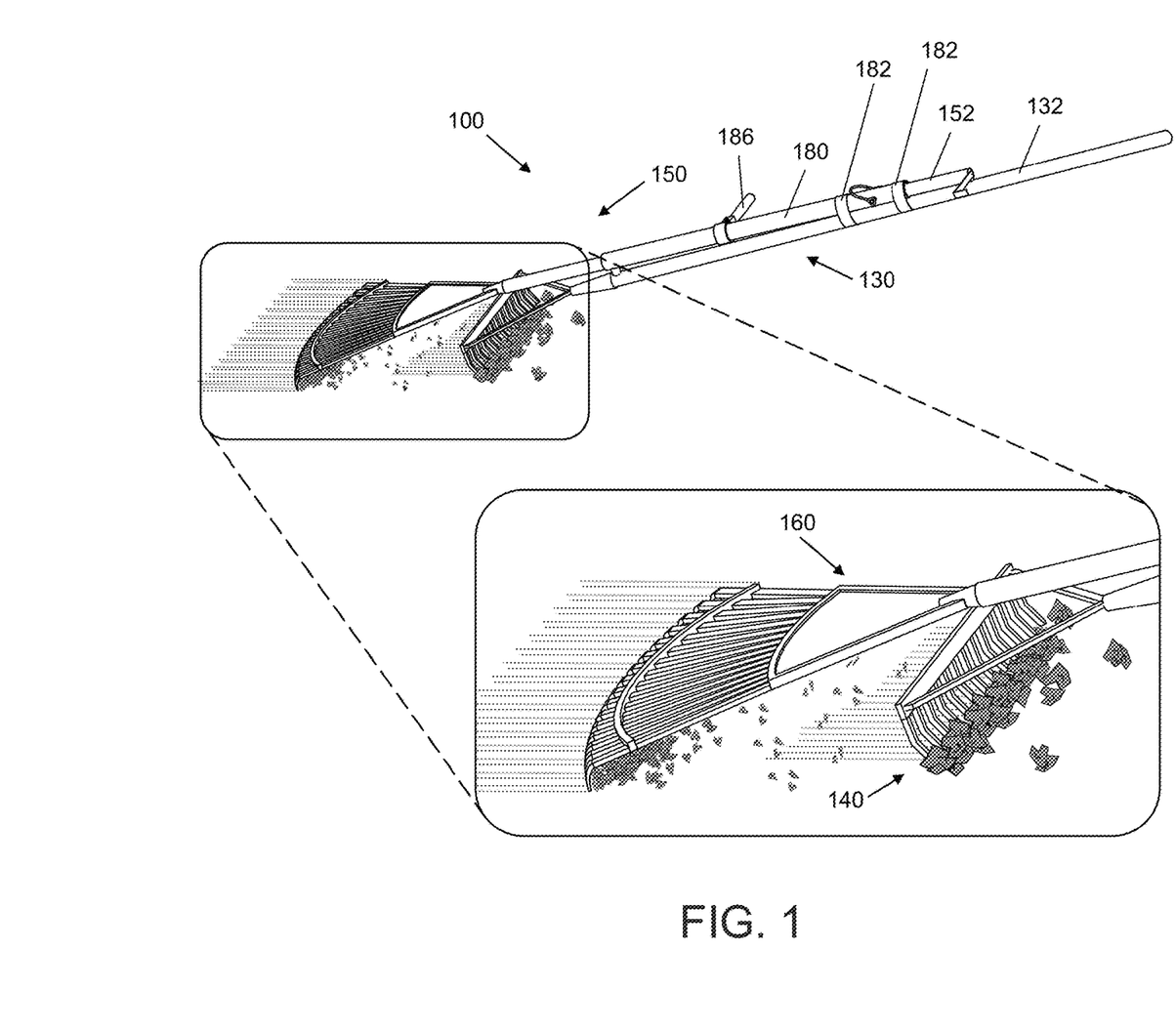
FIG. 1 includes a perspective of a configurable raking system, according to at least one embodiment, and a magnified view therewith of the two rake heads thereof.

In various embodiments, a particular one of which is expressly illustrated in the drawings, a multi-use configurable raking system combines feature benefits of two distinct rake types. In the illustrated embodiment, the raking system 100 combines feature benefits of a garden rake, referenced as a first rake 130, and a leaf rake, referenced as a second rake 150. Outdoor areas can have multiple scattered natural and other material types, including, for example, leaves of multiple varieties, sticks, rocks, loose soil, and man-made litter. The raking system is advantageous at least by use of the two distinct rake types in collecting heterogeneous materials, for example as represented in FIG. 1 in which the first rake and second rake selectively collect and thereby separate different materials.

The first rake 130 has an elongate first handle 132 having a proximal first end 134, and a first rake head 140 at a distal second end 136 of the handle opposite the first end. The first rake head 140 includes a bow having two diverging arms 142 with respective joined proximal first ends connected to the second end of the handle and a raking element 146 spanning the diverged distal second ends of the arms. The proximal joined ends of the arms are connected to the handle 132 at the second end 136 by way of, or with support by, a ferrule 147. The raking element includes multiple generally rigid parallel tines 148 evenly spaced along a support rail 149, which is attached at its opposite ends to respective diverged second ends of the arms 142. Other constructions of garden rakes are within the scope of these descriptions. Such rake heads joined to handles are known such that further description is not needed here.

Figure 2:
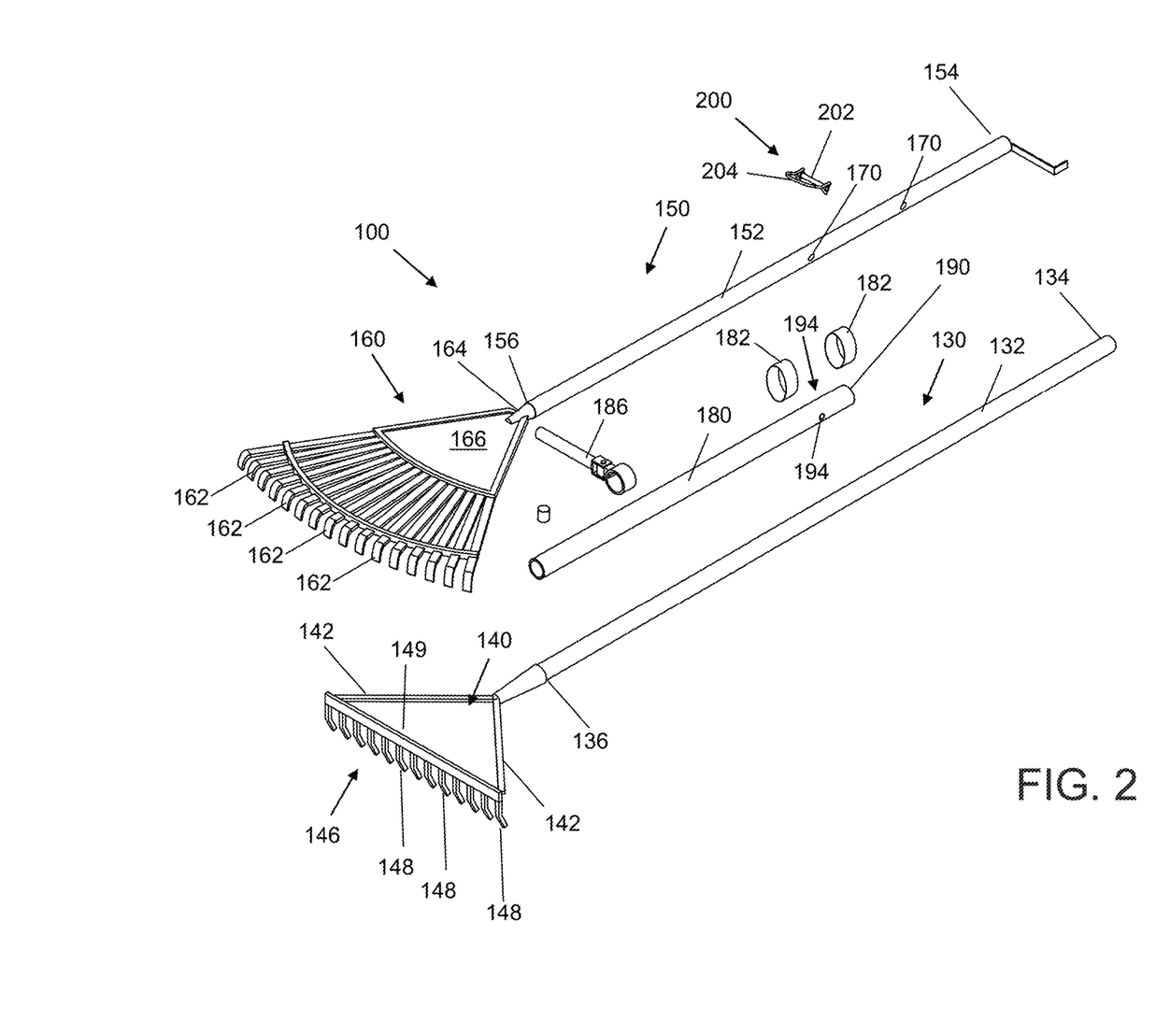
FIG. 2 is an exploded perspective view of the raking system of FIG. 1.
Figure 3:
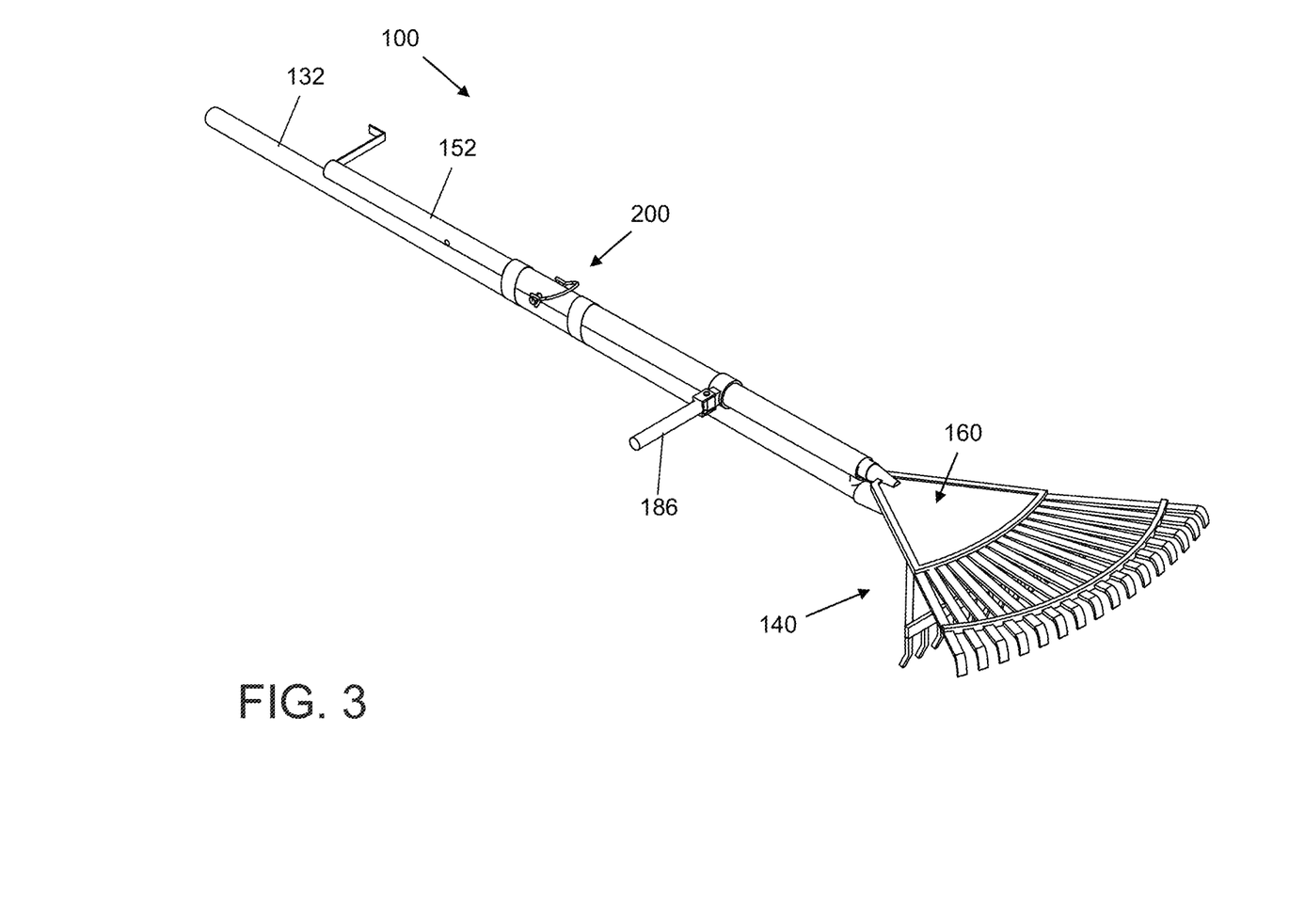
FIG. 3 is a perspective view of the raking system of FIG. 1.
Figure 4:
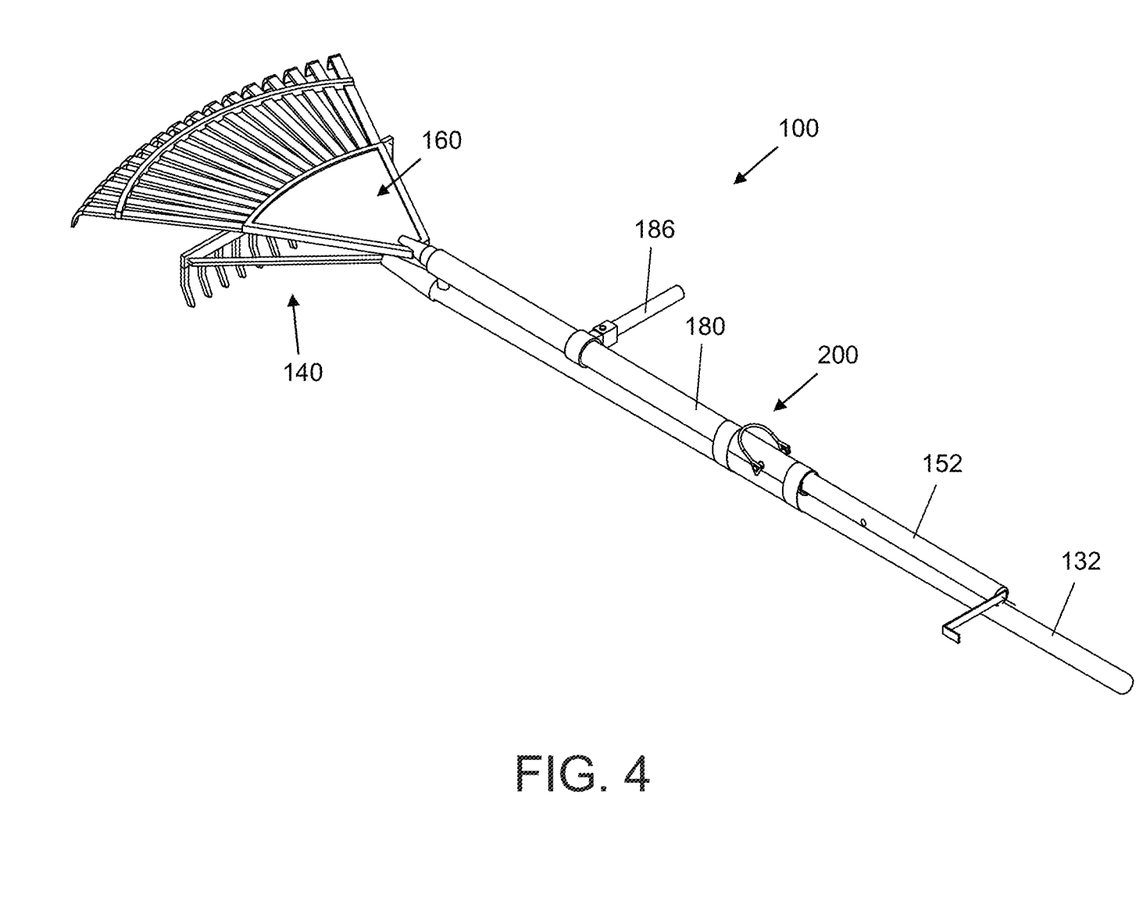
FIG. 4 is another perspective view of the raking system of FIG. 1.
Figure 5:
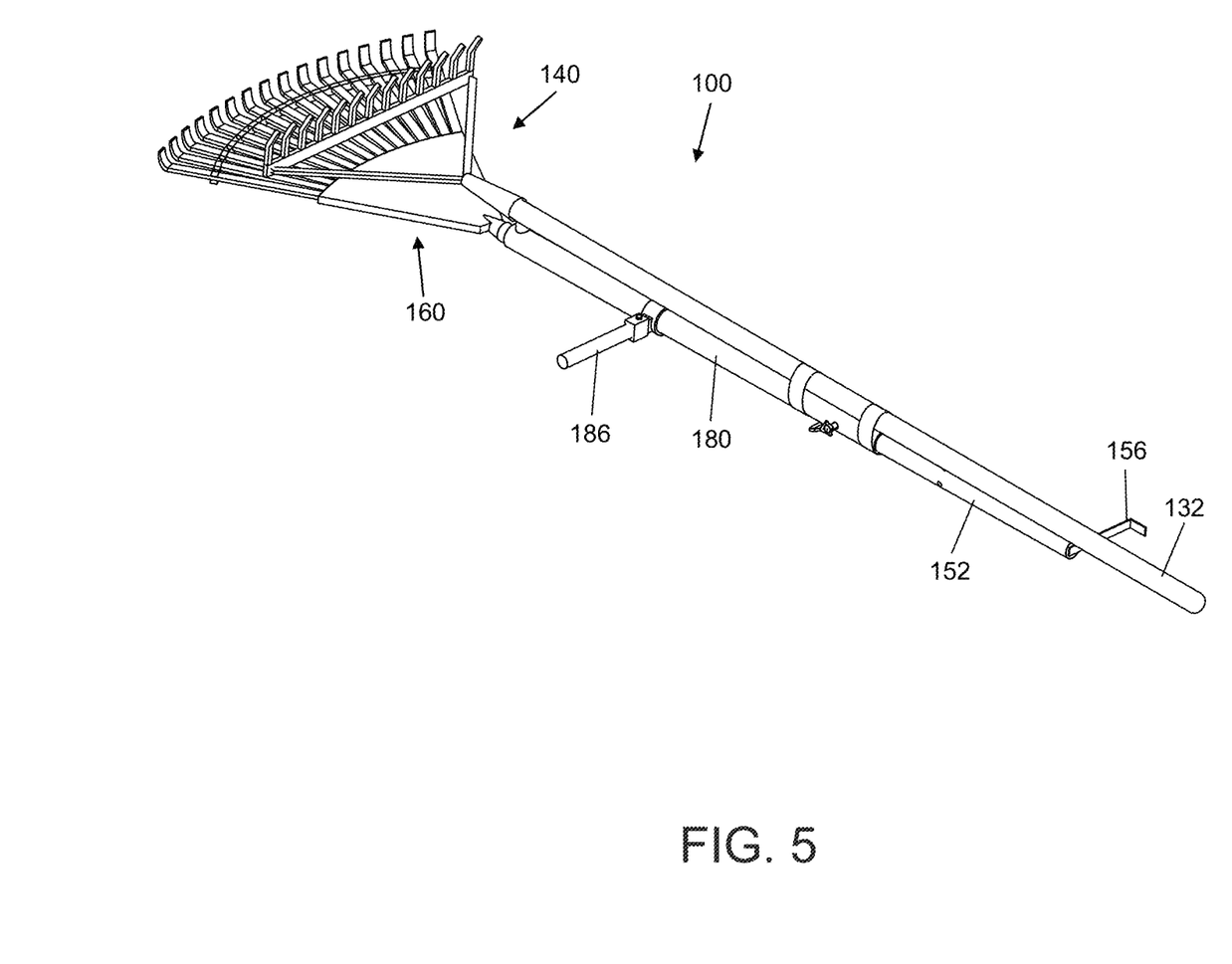
FIG. 5 is another perspective view of the raking system of FIG. 1, shown flipped in orientation relative to that of FIG. 4.
Figure 6:
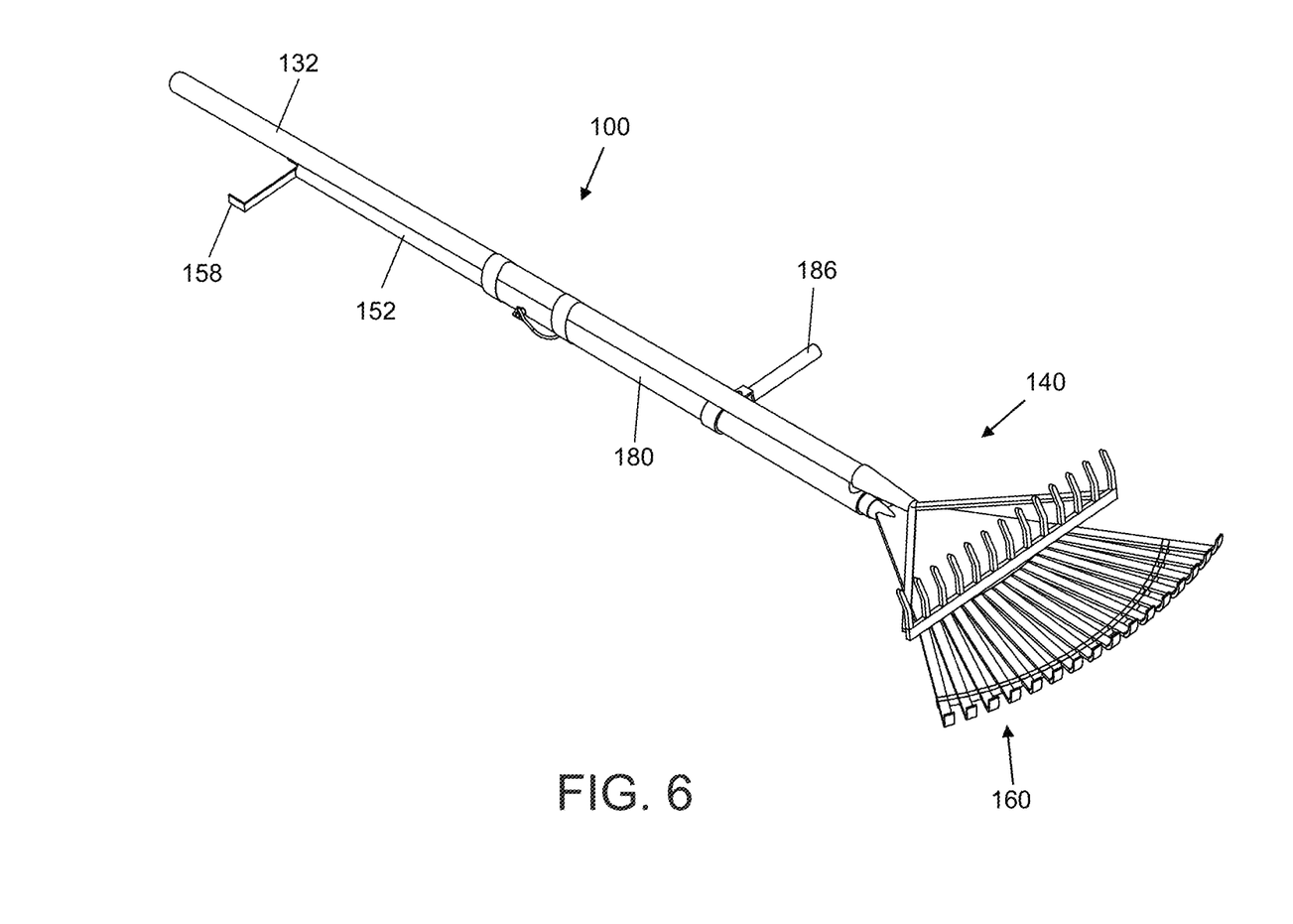
FIG. 6 is another perspective view of the raking system of FIG. 1.
Figures 7, 8:
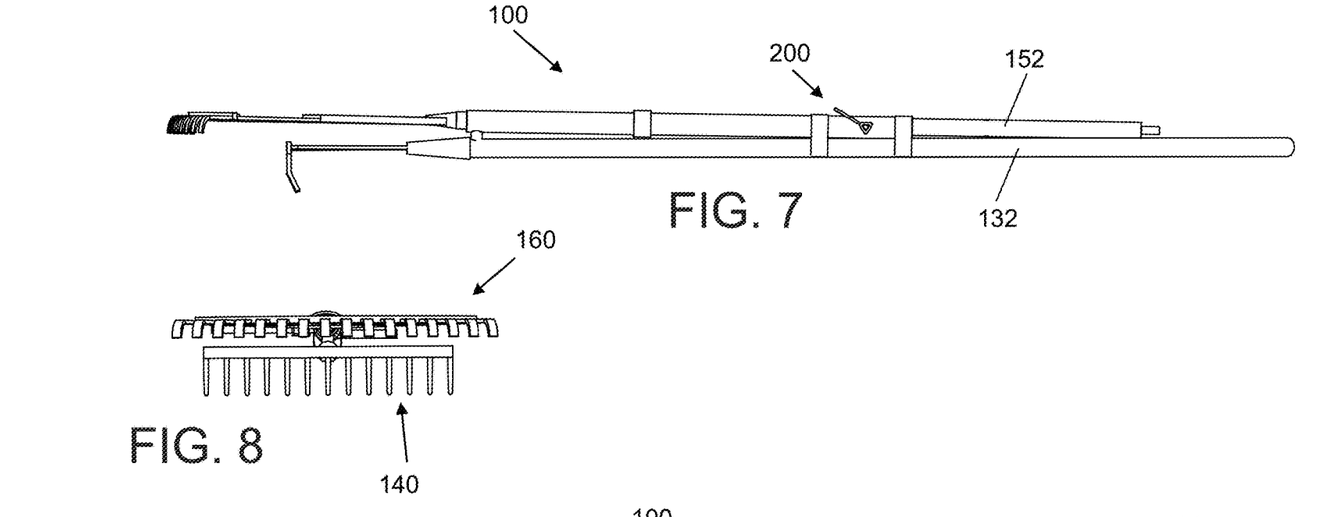
FIG. 7 is a side view of the raking system of FIG. 1.
FIG. 8 is an end view of the raking system of FIG. 1.
Figures 9, 10:
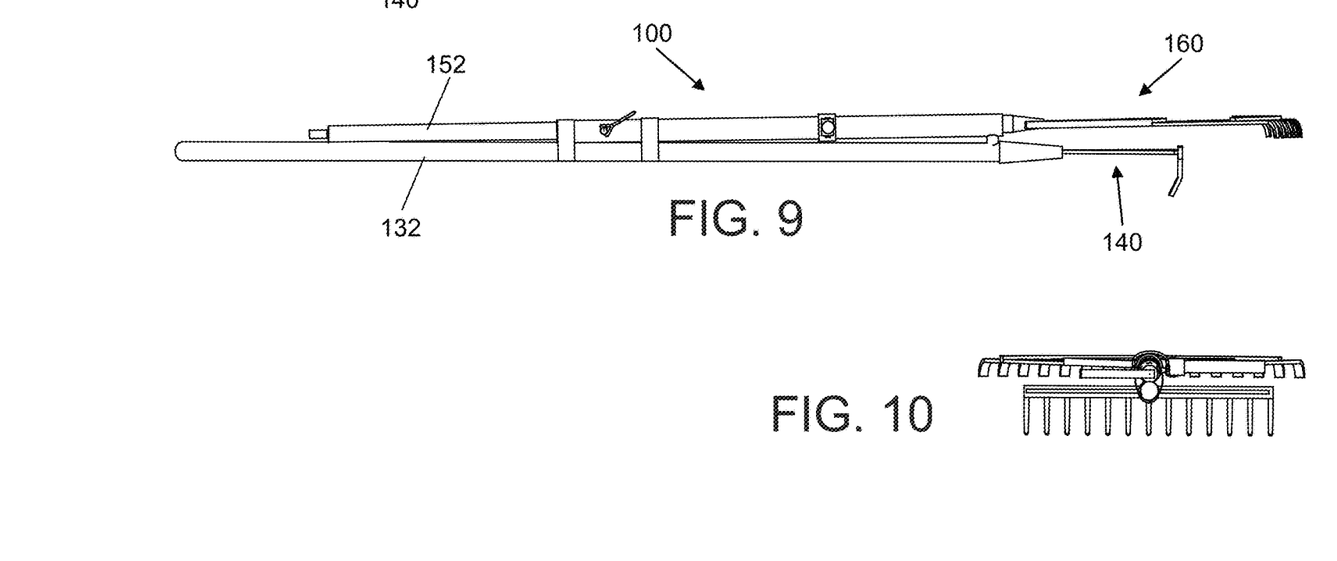
FIG. 9 is a side view of the raking system of FIG. 1, shown flipped in orientation relative to that of FIG. 7.
FIG. 10 is an end view of the raking system opposite that of FIG. 8.

The second rake 150 has an elongate second handle 152 having a terminus for manipulation at a first end 154 (see FIG. 2), and a second rake head 160 at a second end 156 of the handle opposite the first end. The second rake head 160 includes a diverging array of tines 162 which are at least semi-flexible and resilient, each having a distal hooked end. The tines 162 converge from the hooked ends toward a mounting bracket 164 by which the rake head is connected to the second end 156 of the handle 152. In the illustrated embodiment, the tines 162 are connected to, and fan out from, a plate 166 shown as a minor sector of a circle. The tines 162 are connected to the outer arc of the plate 166, and the bracket 164 is connected to the opposite point thereof. Other constructions of leaf rakes are within the scope of these descriptions. For example, some leaf rakes have tines that converge from their hooked ends and overlap at a connecting bracket, which may include a spring-loaded brace to stiffen the converging portions of the tines. These and other such rake heads joined to handles are known such that further description is not needed here.

As a brief general summary with the illustrated embodiment of the configurable raking system 100 and others in mind, the two rakes (130, 150) are joined at their handles by a connector illustrated and referenced in the drawings as a tubular barrel 180, which defines a channel along the interior thereof defining a longitudinal axis 184. One of the rakes, referenced as the first rake 130 in the drawings, is affixed to a connector. The other rake, referenced as the second rake 150 in the drawings, is mounted on the affixed rake by way of the connector, with the handle of the mounted rake received within the interior channel of the barrel 180 in the illustrated embodiment. In the illustrated embodiment, and those within the full scope of these descriptions, the mounted rake 150 can be selectively rotated relative to the barrel 180 or other connector around the longitudinal axis 184 (FIG. 13), permitting the orientation, referring to relative angular position, of the mounted rake 150 relative to the affixed rake 130 to be varied, adjusted, and selected by a user. The mounted rake 150 and can also be moved longitudinally relative to the affixed rake by longitudinal movement along the longitudinal axis 184, permitting the longitudinal position of the mounted rake 150 relative to the fixed rake 130 to be varied, adjusted, and selected by a user. This provides multiple positional selections regarding relative positions of the two rakes, and thus serves multiple uses in the hands of a capable user. In other embodiments, the roles of the first rake 130 and second rake 150 may be reversed, in that the second rake 150 may serve as the affixed rake (affixed to the barrel 180 or other connector), and the first rake 130 may serve as the mounted rake (mounted on the affixed rake by way of the barrel 180 or connector).

Returning to the illustrated embodiment, and details of their mounting, the tubular barrel 180 has a shortened length with respect to the lengths of the handles of the rakes, thus permitting the selective relative longitudinal positioning of the two rakes according to a user's needs. In the illustrated embodiment, a proximal end 190 of the barrel, generally direct toward the first ends of the rakes, is affixed to the handle 132 of the first rake 130 by two longitudinally spaced connecting elements, which are illustrated as bands 182. In various embodiments the connecting elements may be, for example, pipe clamps or other connecting elements of materials including strong tape, collars, heat shrink tubing, brackets, bolts, U-bolts, and other cinching connecting elements. Upon positioning the second handle 152 into the barrel 180, the longitudinal axis of the second handle 150 and that of the interior of the barrel 180 coincide, referenced together in FIG. 14 as longitudinal axis 184. Thus, rotational adjustment of the second rake 150 to orient the two rakes in any preferred relative orientation can be accomplished by rotation of the second rake around the longitudinal axis 182 of the second rake handle 152.

Figures 11, 12:
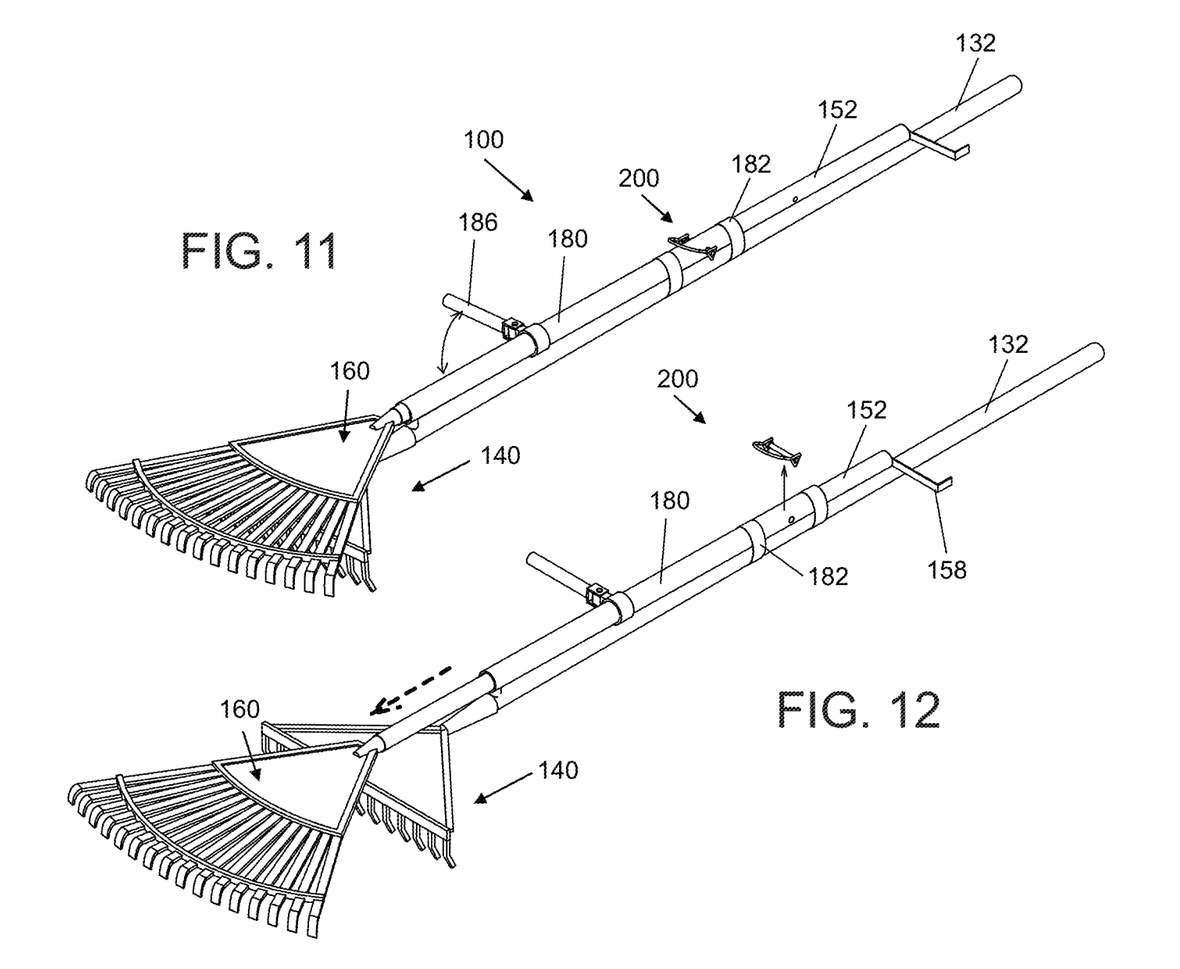
FIG. 11 shows the configurable raking system with the tine sets of the two rake heads facing generally the same direction, and with the two rake heads in a first close-spaced relative longitudinal position.
FIG. 12 shows the configurable raking system as in FIG. 11, shown with the rake heads relatively further longitudinally offset.

A foldable control lever 186 is attached to the barrel 180, at a central longitudinal position forward of the bands. As represented in FIG. 11, the lever 186 is hingedly mounted permitting it to pivot from its illustrated disposition extending perpendicular relative to the longitudinal axis 184 to lay parallel to the longitudinal axis, or at least non-perpendicular, thereby allowing a slim storage profile for the raking system at least along the lengths of the handles when the lever is pivoted.

A locking device 200 is used to lock the second rake 150 in a preferred disposition, referring both to longitudinal position and orientation, to serve the needs of a user. In the illustrated embodiment, the locking device 200 includes a pin 202 (FIG. 2) passed through aligned holes defined through the barrel 180 and second rake handle 152. The second rake handle 152 has longitudinally spaced multiple holes 170 (FIG. 2) in the illustrated embodiment to facilitate locking in multiple longitudinal positions, and even extend the reach of the raking system if desired by a user The longitudinally aligned holes 194 defined through the barrel 180 are advantageously placed between the bands for stability of the locked assembly. A clip 204 engages the pin 202 at both ends thereof to prevent inadvertent removal and loss of the pin. The clip can also serve as a support element by which to hang the raking system for storage.

The raking system 100 is shown in several configuration in the drawings. In FIGS. 1, and 3-11, the second rake head 160 is shown forward of and above the first rake head 140, with the two tine sets of the two rake heads facing generally the same direction for raking action along a common side of the raking system as show in FIG. 1.

Figures 13, 14:
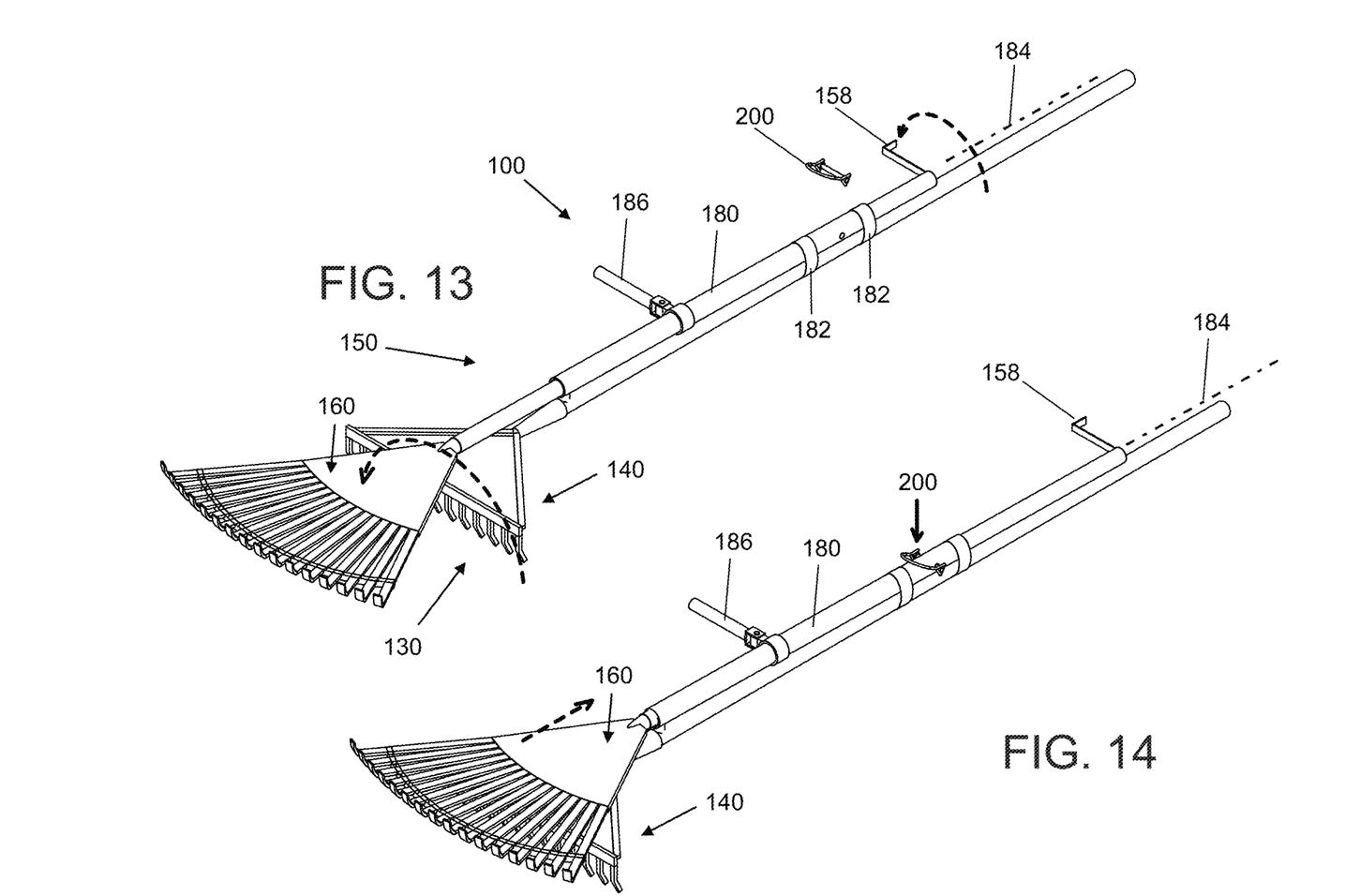
FIG. 13 shows the configurable raking system with the tine sets of two rake heads facing generally opposite directions, and displaced as in FIG. 12.
FIG. 14 shows the configurable raking system as in FIG. 13, with the two rake heads in the first close-spaced relative longitudinal position.

In FIG. 14, the tines of the second rake head 160 are directed oppositely the tines of the first rake head 140 for distinct but separate raking action along two sides of the raking system or for use of only one rake. For example, a user may at times prefer use of only one of the two rake heads, or may prefer their sequential use in various respective tasks in an outdoor area.

FIGS. 12 and 13 illustrate transitioning the raking system from the configuration of FIGS. 1 and 3-11 toward the configuration of FIG. 14. In FIG. 12, the locking device 200 is unlocked, by removal of the pin in the illustrated embodiment, to permit moving the second rake longitudinally and rotationally. By longitudinally offsetting the second rake head 160 sufficiently forward of the first rake head 130, the second rake head can be rotated, as represented in FIG. 13, to the orientation of FIG. 14, in which the second rake can then be pulled rearward to shorten the offset and the pin can be returned to lock the configuration of the raking system.

In the illustrated embodiment the proximal first end of the second handle 152 of the second rake includes a lever 158, which is illustrated perpendicular to the longitudinal axis. The lever 158 conveniently facilitates manipulation, both rotation and longitudinal placement, of the second rake by a user generally at the proximal end of the raking system 100. The user may prefer to use the levers 158 and 186 when adjusting and/or using the configurable raking system. Each lever (158, 186) conveniently extends laterally relative to the longitudinal axis. Each may be hingedly mounted to its respective host structure (132, 180) permitting the lever (158, 186) to pivot from its illustrated disposition extending perpendicular relative to the longitudinal axis 184 to lay parallel to the longitudinal axis thereby allowing a slim storage profile for the raking system at least along the lengths of the handles.

In some embodiments of the raking system 100, the first rake and second rake may be commercially available rakes modified by a provider of the raking system or by the user. For example, the affixed rake, illustrated as the first rake 130 in the drawings, may be modified by affixing the barrel 180 thereon, and the mounted rake, illustrated as the second rake 150, may be modified by the addition of the mounting holes 170. In other embodiments, the raking system 100 as illustrated, and those within the full scope of these descriptions, may be marketed, sold, or provided as a whole, ready for use or requiring some end-user assembly. Components of the raking system 100 not a part of already commercially available rakes may be made, marketed, sold, or provided as a kit, ready for assembly with rakes as illustrated or any others.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:
1. A multi-use configurable raking system comprising:
a first rake having a first handle and a first rake head connected to the first handle;
a second rake having a second handle and a second rake head connected to the second handle; and
a connector affixed to the first rake;
wherein the second handle is mounted on the first handle by way of the connector;

wherein the connector comprises a channel along the longitudinal axis and at least a portion of the second handle is received within the channel;

wherein the connector comprises a tubular barrel having an interior in which the channel is defined, wherein the second handle is mounted on the first handle such that the second rake can be variably positioned relative to the first rake;

wherein an orientation of the second rake relative to the first rake can be adjusted by rotation of the second rake relative to the first rake; and wherein a longitudinal position of the second rake relative to the first rake can be adjusted by movement of the second rake relative to the first rake along a longitudinal axis of the second handle.

2. The multi-use configurable raking system of claim 1, further comprising a locking device by which at least one of the longitudinal position and orientation of the second rake relative to the first rake can be locked and unlocked.

3. The multi-use configurable raking system of claim 1, further comprising a locking device by which each of the longitudinal position and orientation of the second rake relative to the first rake can be locked and unlocked.

4. The multi-use configurable raking system of claim 3, wherein, when the locking device is unlocked:

the second handle can be rotated within the barrel around the longitudinal axis thereby adjusting the orientation of the second rake relative to the first rake; and the second handle can be moved longitudinally within the barrel thereby adjusting the longitudinal position of the second rake relative to the first rake.

5. The multi-use configurable raking system of claim 4, wherein:

the locking device comprises a pin;

at least one of the barrel and second handle comprises at least one hole;

the other of the at least one of the barrel and second handle comprises at least two holes; and the pin is positioned in the at least one hole and in at least one of the at least two holes when the locking device is locked.

6. The multi-use configurable raking system of claim 5, wherein the locking device further comprises a clip that engages two ends of the pin to prevent inadvertent removal of the pin.

7. The multi-use configurable raking system of claim 1, further comprising a lever attached to the barrel.

8. The multi-use configurable raking system of claim 7, wherein the lever is hingedly mounted on the barrel permitting the lever to pivot between perpendicular to the longitudinal axis and non-perpendicular the longitudinal axis.

9. The multi-use configurable raking system of claim 1, further comprising at least two bands that are longitudinally spaced and that affix the tubular barrel to the first handle.

10. The multi-use configurable raking system of claim 1, wherein:

the first rake head comprises multiple first tines; and the second rake head comprises multiple second tines.

11. The multi-use configurable raking system of claim 1, wherein the first rake comprises one of a garden rake and a leaf rake, and the second rake comprises the other of a garden rake and a leaf rake.

12. The multi-use configurable raking system of claim 11, wherein the garden rake comprises multiple generally rigid parallel tines evenly spaced along a support rail.

13. The multi-use configurable raking system of claim 12, wherein the leaf rake comprises a diverging array of tines which are semi-flexible and resilient, each having a distal hooked end.

* * * * *